United States Patent
Higham et al.

(10) Patent No.: US 11,524,459 B1
(45) Date of Patent: *Dec. 13, 2022

(54) ADDITIVE MANUFACTURING ON-ORBIT

(71) Applicant: Space Systems/Loral, LLC, Palo Alto, CA (US)

(72) Inventors: John Scott Higham, Mountain View, CA (US); Gordon Wu, Lafayette, CO (US); Daniel Andrew Fluitt, Santa Rosa, CA (US); Elijah Zebadiah Gurnee, San Bruno, CA (US); Jude Zils, Santa Cruz, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 17/234,664

(22) Filed: Apr. 19, 2021

Related U.S. Application Data

(63) Continuation of application No. 15/885,484, filed on Jan. 31, 2018, now Pat. No. 11,014,303.

(Continued)

(51) Int. Cl.
*B29C 64/295* (2017.01)
*B64G 4/00* (2006.01)
(Continued)

(52) U.S. Cl.
CPC .......... *B29C 64/295* (2017.08); *B29C 64/118* (2017.08); *B29C 64/393* (2017.08);
(Continued)

(58) Field of Classification Search
None
See application file for complete search history.

(56) References Cited

U.S. PATENT DOCUMENTS

| 4,155,524 A | 5/1979 | Marello et al. |
| 5,356,095 A | 10/1994 | Aker |

(Continued)

FOREIGN PATENT DOCUMENTS

| CN | 106356640 A | 1/2017 |
| CN | 106742084 A | 5/2017 |

(Continued)

OTHER PUBLICATIONS

Booth, P. et al., "Enhancements to satellite feed chain performance, testing and lead-times using additive manufacturing," Airbus Defence and Space Ltd. 10th European Conference on Antennas and Propagation (EuCAP), Apr. 10-15, 2016, 5 pages.

(Continued)

*Primary Examiner* — Jacob T Minskey
*Assistant Examiner* — Adrianna N Konves
(74) *Attorney, Agent, or Firm* — Weaver Austin Villeneuve & Sampson LLP

(57) ABSTRACT

A spacecraft includes an additive manufacturing (A/M) subsystem and one or both of a thermal control arrangement and a contamination control arrangement. The A/M subsystem includes an A/M tool, feedstock and a workpiece and is configured to additively manufacture the workpiece using material from the feedstock. The thermal control arrangement is operable, in an on-orbit space environment characterized by near vacuum pressure and near zero-g force, to maintain temperature of at least one of the A/M tool, the feedstock, and the workpiece within respective specified ranges. The contamination control arrangement is operable, in the on-orbit space environment, to control outgassing of volatile organic compounds (VOCs).

18 Claims, 7 Drawing Sheets

Related U.S. Application Data

(60) Provisional application No. 62/523,185, filed on Jun. 21, 2017.

(51) Int. Cl.

| | |
|---|---|
| *B33Y 30/00* | (2015.01) |
| *B64G 1/52* | (2006.01) |
| *B33Y 50/02* | (2015.01) |
| *B33Y 10/00* | (2015.01) |
| *B29C 64/393* | (2017.01) |
| *B29C 64/118* | (2017.01) |
| *B29K 101/12* | (2006.01) |

(52) U.S. Cl.
CPC .............. *B33Y 10/00* (2014.12); *B33Y 30/00* (2014.12); *B33Y 50/02* (2014.12); *B64G 1/52* (2013.01); *B64G 4/00* (2013.01); *B29K 2101/12* (2013.01); *B64G 2004/005* (2013.01)

(56) References Cited

U.S. PATENT DOCUMENTS

| | | | |
|---|---|---|---|
| 6,260,798 | B1 | 7/2001 | Casiez et al. |
| 9,306,254 | B1 | 4/2016 | Hovey et al. |
| 9,562,616 | B2 | 2/2017 | Strom et al. |
| 10,573,949 | B2 | 2/2020 | Fluitt et al. |
| 11,014,303 | B1 | 5/2021 | Higham et al. |
| 2002/0073715 | A1 | 6/2002 | Logan et al. |
| 2005/0241801 | A1 | 11/2005 | Mitchell et al. |
| 2012/0303185 | A1 | 11/2012 | Munir et al. |
| 2015/0112472 | A1 | 4/2015 | Chen et al. |
| 2017/0029765 | A1 | 2/2017 | Vellinger et al. |
| 2017/0036783 | A1 | 2/2017 | Snyder |
| 2017/0157826 | A1 | 6/2017 | Hishiki |
| 2017/0200997 | A1 | 7/2017 | Gomberg |
| 2018/0015670 | A1 | 1/2018 | Gu et al. |
| 2022/0120325 | A1 | 4/2022 | Greenspan et al. |

FOREIGN PATENT DOCUMENTS

| | | |
|---|---|---|
| CN | 110217408 A | 9/2019 |
| KR | 20090081139 A | 7/2009 |
| WO | WO-2017049367 A1 | 3/2017 |
| WO | WO-2017059866 A2 | 4/2017 |
| WO | WO-2017079130 A1 | 5/2017 |
| WO | WO-2018029455 A1 | 2/2018 |

OTHER PUBLICATIONS

Booth, P. et al., "Using additive manufacturing for feed chain and other passive microwave components," Airbus Defence and Space Ltd., 11th European Conference on Antennas and Propagation (EUCAP), 2017, 5 pages.

Dimitriadis et al., "Polymer-Based Additive Manufacturing of High-Performance Waveguide and Antenna Components," Proceedings of the IEEE, vol. 105. No. 4., Apr. 1, 2017, XP055532388, pp. 668-676.

Dunn, JJ, et al., "3D Printing in Space: Enabling New Markets and Accelerating the Growth of Orbital Infrastructure," Made in Space, Inc Space Manufacturing 14: Critical Technologies for Space Settlement Space Studies Institute, Oct. 29-31, 2010, 14 pages.

European Office Action dated Mar. 2, 2020 issued in EP Application No. 18185270.8.

Extended European Search Report dated Dec. 19, 2018 issued in EP Application No. 18185270.8.

Peverini, O.A. et al., "Selective laser melting manufacturing of microwave waveguide devices," National Research Council of Italy, Turin, Italy, Proceedings of the IEEE, 2016, 12 pages.

Thornton, J. et al., "Additive Manufacturing of Waveguide for Ku-band Satellite Communications Antenna", European Conference on Antennas and Propagation (EuCAP), Davos, Switzerland, Apr. 10-15, 2016, 4 pages.

U.S. Notice of Allowance (Corrected) dated Jan. 2, 2020 issued in U.S. Appl. No. 15/818,542.

U.S. Notice of Allowance dated Oct. 23, 2019 issued in U.S. Appl. No. 15/818,542.

U.S. Office Action dated Apr. 22, 2020 issued in U.S. Appl. No. 15/885,484.

U.S. Office Action dated May 9, 2019 issued in U.S. Appl. No. 15/818,542.

U.S. Appl. No. 16/817,286 , Inventors Gorsuch et al.filed Mar. 12, 2020.

Werkheiser, N., "Overview of NASA Initiatives in 3D Printing and Additive Manufacturing," Marshall Space Flighter Center, National Aeronautics and Space Administration 2014 DoD Maintenance Symposium, Birmingham, AL Nov. 17-20, 2014, 28 pages.

U.S. Final Office Action dated Aug. 20, 2020 issued in U.S. Appl. No. 15/885,484.

U.S. Notice of Allowance dated Jan. 25, 2021 issued in U.S. Appl. No. 15/885,484.

U.S. Non-Final Office Action dated Aug. 23, 2022, in U.S. Appl. No. 16/817,286.

ADDITIVE MANUFACTURING ON-ORBIT

CROSS-REFERENCE TO RELATED APPLICATIONS

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

This disclosure relates generally to additive manufacturing techniques, and more particularly to additive manufacturing techniques for use on a spacecraft in an on-orbit space environment characterized by near vacuum pressure and near zero-g force.

BACKGROUND OF THE INVENTION

The assignee of the present invention designs and manufactures spacecraft. A robotic servicing vehicle capable of repairing or updating an orbiting spacecraft is desirable. Such servicing vehicles may include a variety of generic tools, fittings and parts ("service articles") for a range of foreseen and unforeseen missions. In the absence of the presently disclosed techniques, when a custom (non-generic) service article is required, it is necessary to separately deliver the service article into orbit (via a payload orbital delivery system (PODS), for example), resulting in substantial delays and costs.

Fabricating a service article on-orbit by way of an additive manufacturing (A/M) process is desirable, but the zero-g vacuum environment of space presents formidable technical challenges, particularly related to thermal control and contamination control of the A/M process.

SUMMARY

According to some implementations, a spacecraft includes an additive manufacturing (A/M) subsystem and one or both of a thermal control arrangement and a contamination control arrangement. The A/M subsystem includes an A/M tool, feedstock and a workpiece and is configured to additively manufacture the workpiece using material from the feedstock. The thermal control arrangement is operable, in an on-orbit space environment characterized by near vacuum pressure and near zero-g force, to maintain temperature of at least one of the A/M tool, the feedstock, and the workpiece within respective specified ranges. The contamination control arrangement is operable, in the on-orbit space environment, to control outgassing of volatile organic compounds (VOCs).

In some examples, the A/M tool may be an extruder including a melt zone, a cold zone and a transition portion disposed between the melt zone and the cold zone. In some examples, the extruder may be configured to limit heat transfer between the melt zone and the cold zone.

In some examples, the thermal control arrangement may include a plurality of phase change material (PCM) modules. In some examples, some of the plurality of PCM modules may be configured to control temperature of the A/M tool and some of the plurality of PCM modules may be configured to control temperature of the workpiece. In some examples, the spacecraft may further include a robotic manipulator configured to remove and replace one or more of the plurality of PCM modules.

In some examples, the contamination control arrangement may include a chamber enclosing the A/M subsystem and one or more cold plates disposed in the chamber and configured to capture VOCs. In some examples, the spacecraft may further include one or more radiative heaters configured to heat the work piece to a temperature above a boiling temperature of the VOCs and below a glass transition temperature of the workpiece material. In some examples, the spacecraft may further include a robotic manipulator configured to remove and replace the cold plates. In some examples, the chamber may include vent paths disposed to allow exit of gaseous byproducts while avoiding generation of a net torque on the spacecraft.

According to some implementations, an additive manufacturing (A/M) subsystem for use on a spacecraft includes an A/M tool and a feedstock. The A/M subsystem is configured to additively manufacture a workpiece using material from the feedstock. The spacecraft includes one or both of a thermal control arrangement and a contamination control arrangement. The thermal control arrangement is operable, in an on-orbit space environment characterized by near vacuum pressure and near zero-g force, to maintain temperature of at least one of the A/M tool, the feedstock, and the workpiece within respective specified ranges. The contamination control arrangement is operable, in the on-orbit space environment, to control outgassing of volatile organic compounds (VOCs).

In some examples, the thermal control arrangement may include a plurality of phase change material (PCM) modules. In some examples, some of the plurality of PCM modules may be configured to control temperature of the A/M tool and some of the plurality of PCM modules may be configured to control temperature of the workpiece.

In some examples, the contamination control arrangement may include a chamber enclosing the A/M subsystem and one or more cold plates disposed in the chamber and configured to capture VOCs. In some examples, the chamber may include vent paths disposed to allow exit of gaseous byproducts while avoiding generation of a net torque on the spacecraft.

In some implementations, a method of performing additive manufacturing (A/M) on board a spacecraft includes: fabricating a workpiece from a feedstock using an A/M subsystem on board the spacecraft in an on-orbit space environment characterized by near vacuum pressure and near zero-g force, the A/M subsystem including an A/M tool and the feedstock, the spacecraft including a thermal control arrangement and a contamination control arrangement; maintaining, with the thermal control arrangement, temperature of at least one of the A/M tool, the feedstock, and the workpiece within respective specified ranges; and controlling, with the contamination control arrangement, outgassing of volatile organic compounds (VOCs).

In some examples, the thermal control arrangement may include a plurality of phase change material (PCM) modules.

In some examples, the contamination control arrangement may include a chamber enclosing the A/M subsystem and one or more cold plates disposed in the chamber and configured to capture VOCs. In some examples, the spacecraft may include a robotic manipulator configured to remove and replace the cold plates. In some examples, the chamber may include vent paths disposed to allow exit of gaseous byproducts while avoiding generation of a net torque on the spacecraft.

BRIEF DESCRIPTION OF THE DRAWINGS

Features of the invention are more fully disclosed in the following detailed description, reference being had to the accompanying drawings, in which like reference numerals designate like elements, and in which.

Figure 1:
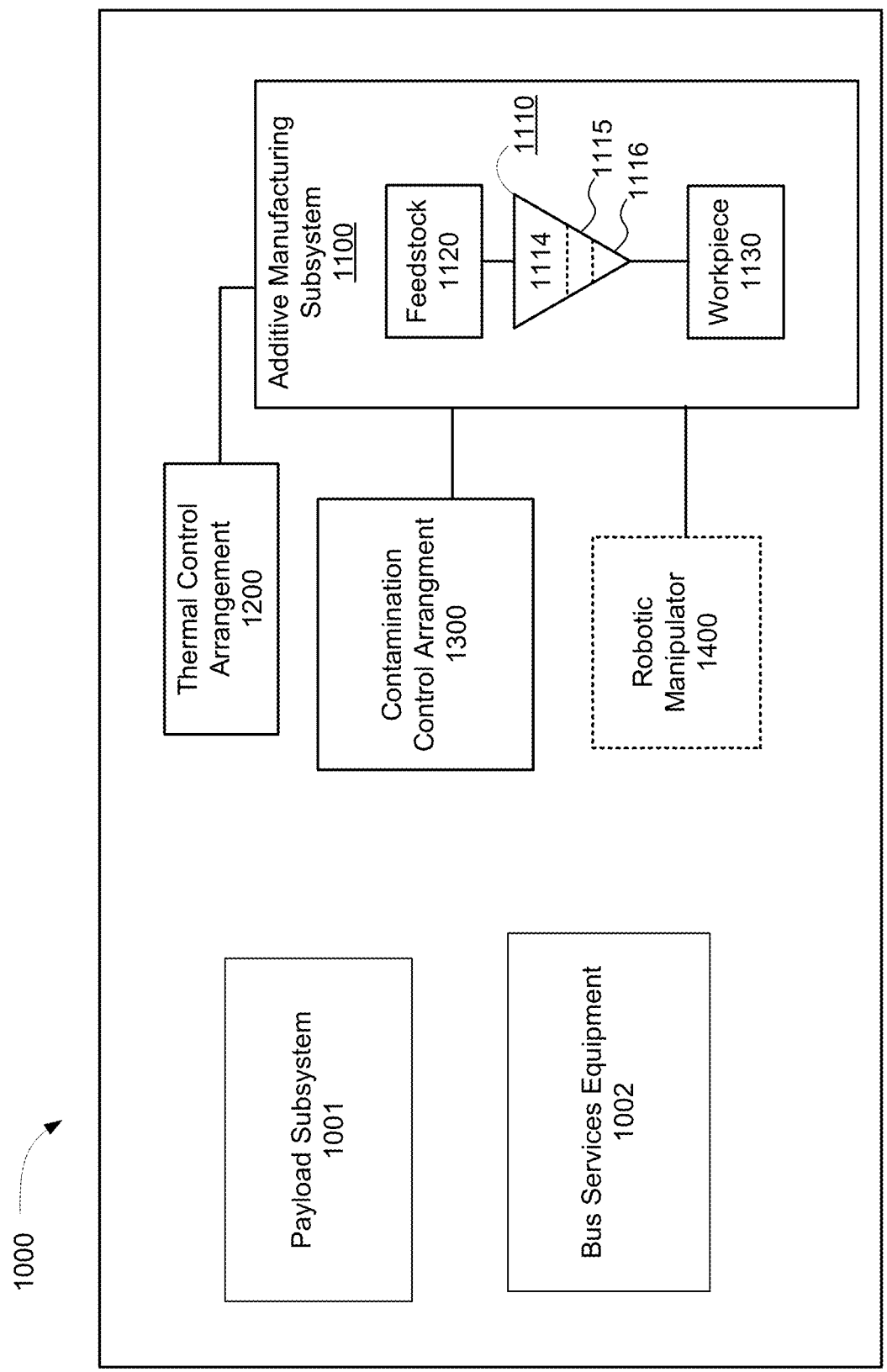
FIG. 1 illustrates a simplified block diagram of a spacecraft, according to an implementation.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. It will be understood that although the terms "first" and "second" are used herein to describe various elements, these elements should not be limited by these terms. These terms are used only to distinguish one element from another element. As used herein, the term "and/or" includes any and all combinations of one or more of the associated listed items. The symbol "/" is also used as a shorthand notation for "and/or".

The present disclosure contemplates a spacecraft including an additive manufacturing (A/M) subsystem. The spacecraft may be configured as an unmanned robotic servicing vehicle, for example, operable to approach and service (repair, refuel, and/or upgrade) a client spacecraft. The A/M subsystem may include one or more A/M tools for fabricating a workpiece using material from a feedstock. An A/M tool, as the term is used herein and in the claims includes an arrangement for performing one or more A/M processes, including, for example, material extrusion, material jetting, vat polymerization, binder jetting, powder fed fusion, sheet lamination and directed energy deposition. For example, an A/M tool may be or include a 3D printer operable to melt and extrude material from a feed stock to build up a printed part ("workpiece"). In some implementations, the feedstock may be Polytetrafluoroethylene (PTFE) Polyetherketoneketone (PEKK) or other thermoplastic having a characteristic glass transition temperature suitable for use in a 3D printer.

According to the presently disclosed techniques, the spacecraft includes arrangements for thermal control and/or contamination control that enable the A/M tool to be compatible with and operable in an on-orbit space environment in which the spacecraft is expected to operate, i.e., an environment characterized by near-vacuum ambient pressure and near zero-g-force. In some implementations, the A/M tool may be configured to print a thermoplastic workpiece and may include an extruder. The thermal control arrangement may be configured to maintain temperature of the extruder, the thermoplastic feedstock and/or the finished printed component or workpiece-in-process within respective specified ranges. The contamination control arrangement may be configured to prevent volatile organic compounds (VOCs) generated during an A/M process from reaching contamination sensitive equipment on board the spacecraft.

FIG. 1 illustrates a simplified block diagram of a spacecraft, according to an implementation. In the illustrated example, a spacecraft 1000 includes a payload subsystem 1001, bus services equipment 1002 (that may include, for example, power, propulsion and attitude control equipment) an additive manufacturing subsystem 1100, a thermal control arrangement 1200, and a contamination control arrangement 1300. Optionally, the spacecraft 1000 may also include a robotic manipulator 1400. The additive manufacturing subsystem 1100 includes an A/M tool 1110 that is coupled with a feedstock 1120, and is configured to fabricate a workpiece 1130. In the illustrated example, the A/M tool 1110 includes a proximal portion 1114, a distal (or "working") portion 1116 separated by a middle (or "transition") portion 1115. The working portion 1116 may be or include a zone in which high temperature processes are performed, for example heating and/or melting of material from the feedstock. In some implementations, for example, the working portion 1116 may include a heatable nozzle or directed energy source such as a laser or electron beam.

Figure 2:
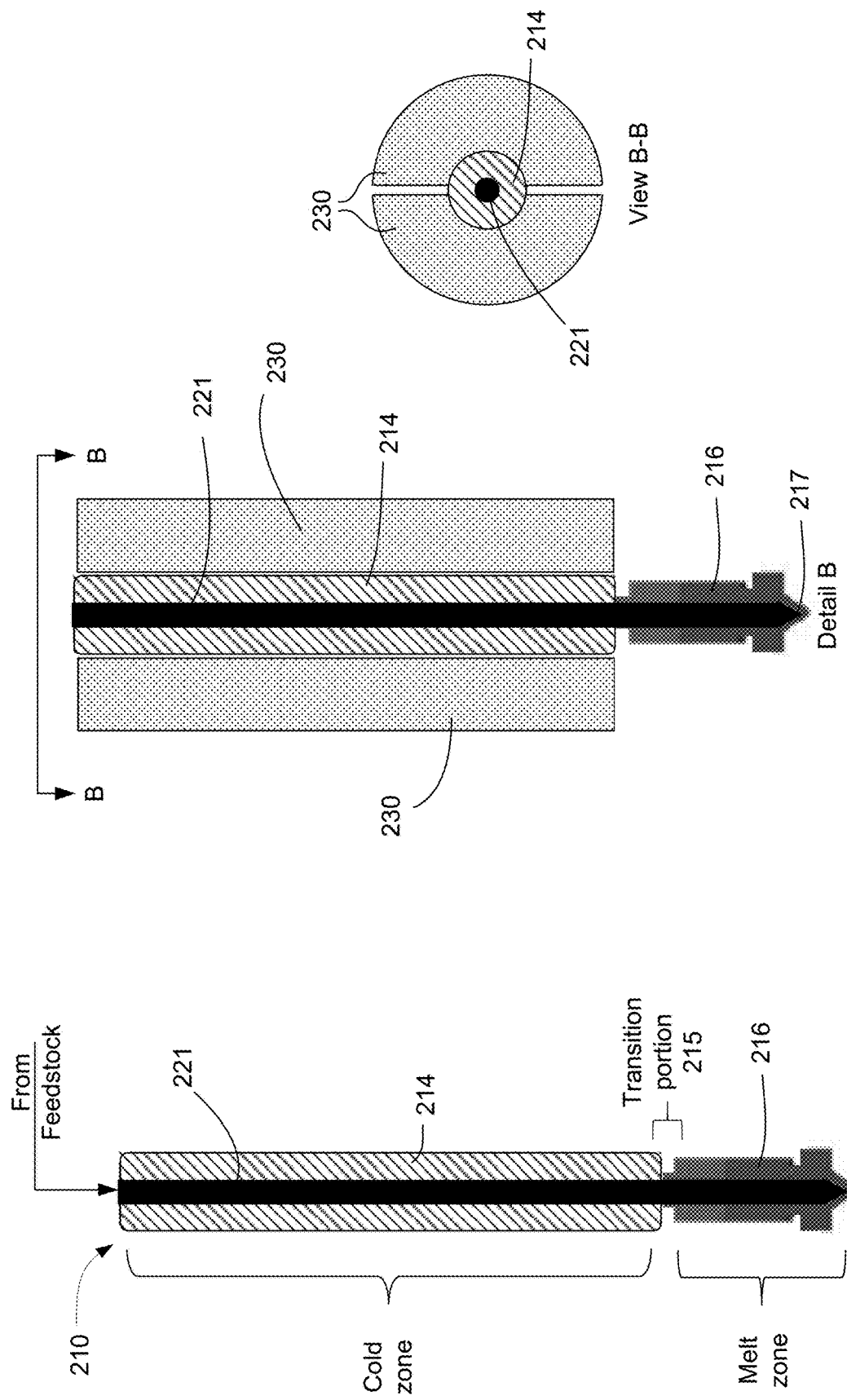
FIG. 2 illustrates an example of a portion of an A/M tool configured as an extruder, according to an implementation.

FIG. 2 illustrates an example of a portion of an A/M tool configured as an extruder. Referring first to Detail A, the extruder 210 includes a proximal portion 214 and a working portion 216 separated by a transition portion 215. In the illustrated example, the working portion 216 has a distal portion configured as a nozzle 217 and is disposed in or includes a "melt zone". In some implementations, the melt zone may be heated to a temperature of 300° C. or higher.

A filament 221 of build material may be fed into the proximal portion 214 from a feedstock (not illustrated) of build material and urged towards the working portion 216 by mechanical or other means. As build material reaches the working portion, the build material may be heated, liquified, and then extruded through a distal portion of the melt zone, for example through a nozzle orifice. Preferably, the proximal portion 214 is maintained at a temperature below the glass transition temperature of the build material, whereas temperatures in the melt zone are necessarily substantially higher than the glass transition temperature. Accordingly, a temperature gradient across the transition portion 215 is quite large.

Achieving the foregoing temperature objectives in a typical terrestrial environment, (i.e., with free convective cooling, abundant heatsink capability, and in the absence of the power and mass constraints imposed by a spacecraft design) is relatively straightforward. For example, the proximal portion 214 may be configured with heat exchanger fins proximate to which a cooling fluid may be continuously pumped to a heatsink.

In an on-orbit space environment characterized by near vacuum ambient pressure and near zero-g force, and given power and mass constraints imposed by a spacecraft design, innovative techniques for thermal control are necessary. The present inventors have appreciated that the thermal control arrangement may, advantageously, include a number of replaceable modules of phase change material (PCM). For, example, referring now to FIG. 2, Detail B, an example is illustrated in which two PCM modules 230 are thermally coupled with the proximal portion 214 of the extruder 210. The PCM modules 230 may include a container that encloses material capable of changing phase in a particular temperature range. For example, the PCM modules 230 may include one or more of a high-density polyethylene, a wax, a paraffin material or a eutectic salt, a water and/or alcohol mixture for example. In some implementations, the PCM modules 230 may include features disclosed in U.S. patent application Ser. No. 15/637,466, filed Jun. 29, 2017, entitled SPACECRAFT RADIATOR SYSTEM AND METHOD, assigned to the assignee of the present disclosure, and hereby incorporated by reference into the present disclosure in its entirety.

During operation of the extruder 210, the PCM modules 230 absorb heat from the proximal portion 214. As a result, the enclosed PCM material, which may initially be in a solid state, gradually melts. Advantageously the PCM modules 230 may be configured to maintain a temperature of the proximal portion 214 below a glass transition temperature of the filament 221. Upon a PCM module 230 becoming depleted, that is, when most or all of the enclosed PCM material has melted, it may be removed and replaced with a fresh PCM module 230 in which the enclosed PCM material is at least mostly in the solid state. Such "swapping out" of PCM modules 230 may be accomplished, in some implementations, using a robotic manipulator. Advantageously, while a depleted PCM module 230 is being swapped out during operation of the extruder 210, at least one undepleted PCM module 230 remains thermally coupled with the proximal portion 214 of the extruder 210 during operation of the extruder 210. A depleted PCM module 230 may be moved, using the robotic manipulator, for example, to a relatively cool location. In some implementations, the depleted PCM module 230 may be moved to a location that is thermally coupled with a thermal radiator, for example. In some implementations, the location may be thermally coupled with a thermal radiator, by way of one or more heat pipes, for example.

A thermal interface between the PCM module 230 and the proximal portion 214 of the extruder 210 may include a thermally conductive gasket (not illustrated). A similar or differently configured thermal interface may be established between a depleted PCM module 230 and a feature that is thermally coupled with a thermal radiator. The thermal radiator may include heat pipes, vapor chambers, thermoelectric devices, and/or highly conductive material, such as annealed pyrolytic graphite or copper or silver, to facilitate removal of heat from a depleted PCM module 230.

Figure 3A:
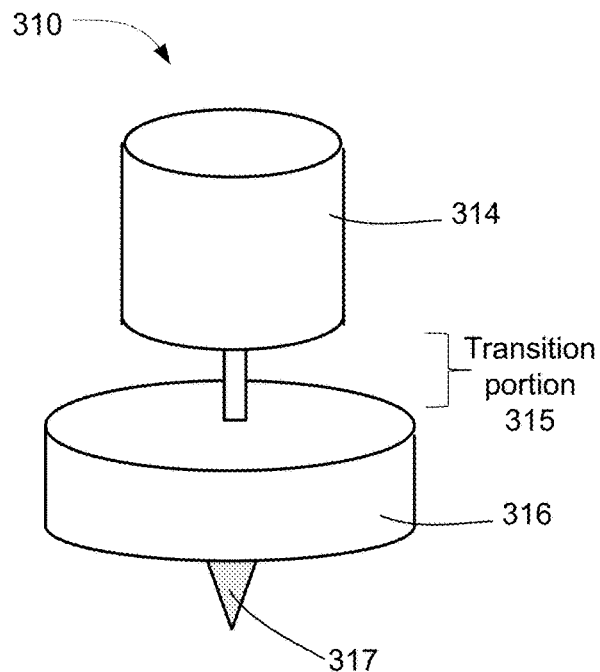
FIGS. 3A and 3B illustrate schematic representations of an extruder, according to an implementation.
Figure 3B:
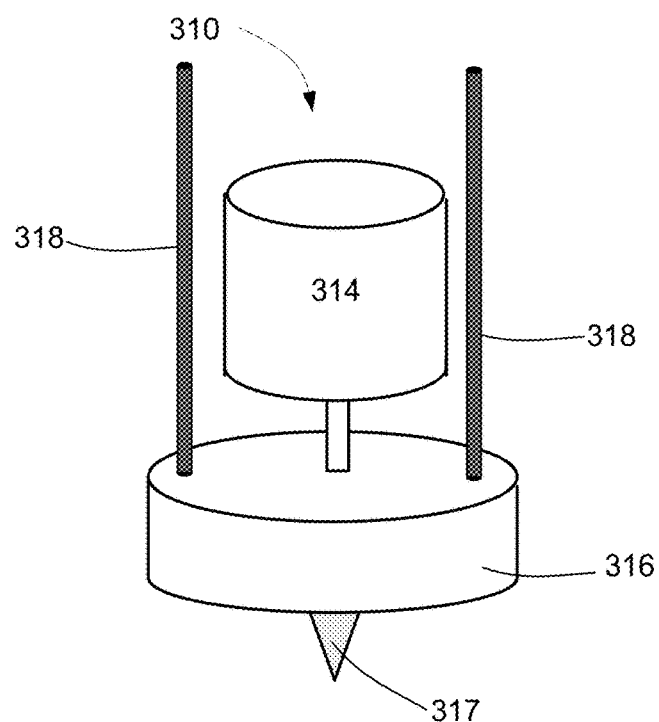

In some implementations, an extruder may be configured to limit heat transfer between a melt zone and a cold zone. FIGS. 3A and 3B illustrate schematic representations of an extruder, according to an implementation. As illustrated in FIG. 3A, an extruder 310 includes, at or near a distal portion, a nozzle 317 and a melt zone 316, and a proximal portion 314. The proximal portion 314 is preferably maintained at a relatively low temperature and may be referred to as a "cold zone". A transition portion 315 is disposed between the proximal portion 314 and the melt zone 316. It is desirable to avoid unnecessary length of the transition portion, so as to minimize the length of build material filament, outside the melt zone that is above the glass transition temperature. In the illustrated implementation, to reduce heat conduction from the melt zone to the transition zone, the transition zone may be configured as a thin-walled tube configured to guide the filament from the cold zone to the melt zone but not, necessarily, configured to bear structural loads. The thin-walled tube may be formed of a low thermal conductivity material such as, for example, Ti-6Al-4V or a ceramic, and some patients. To the extent that conductive heat leakage from the melt zone to the transition zone does occur, the leakage may be compensated by one or both of increasing heater power in the melt zone and increasing thermal control in the cold zone.

Referring now to FIG. 3B, an implementation is illustrated in which the extruder 310 is configured to include structural members 318 that may support and secure the melt zone 316 and nozzle 317 to a base or positioning mechanism (not illustrated). Advantageously, the structural members 318 do not provide a heat conduction path between the melt zone 316 and the transition portion 315 and the cold zone 314. As a result, maintenance of widely disparate temperatures in each of the melt zone 316, the transition portion 315 and the cold zone 314 may be facilitated.

Figure 4:
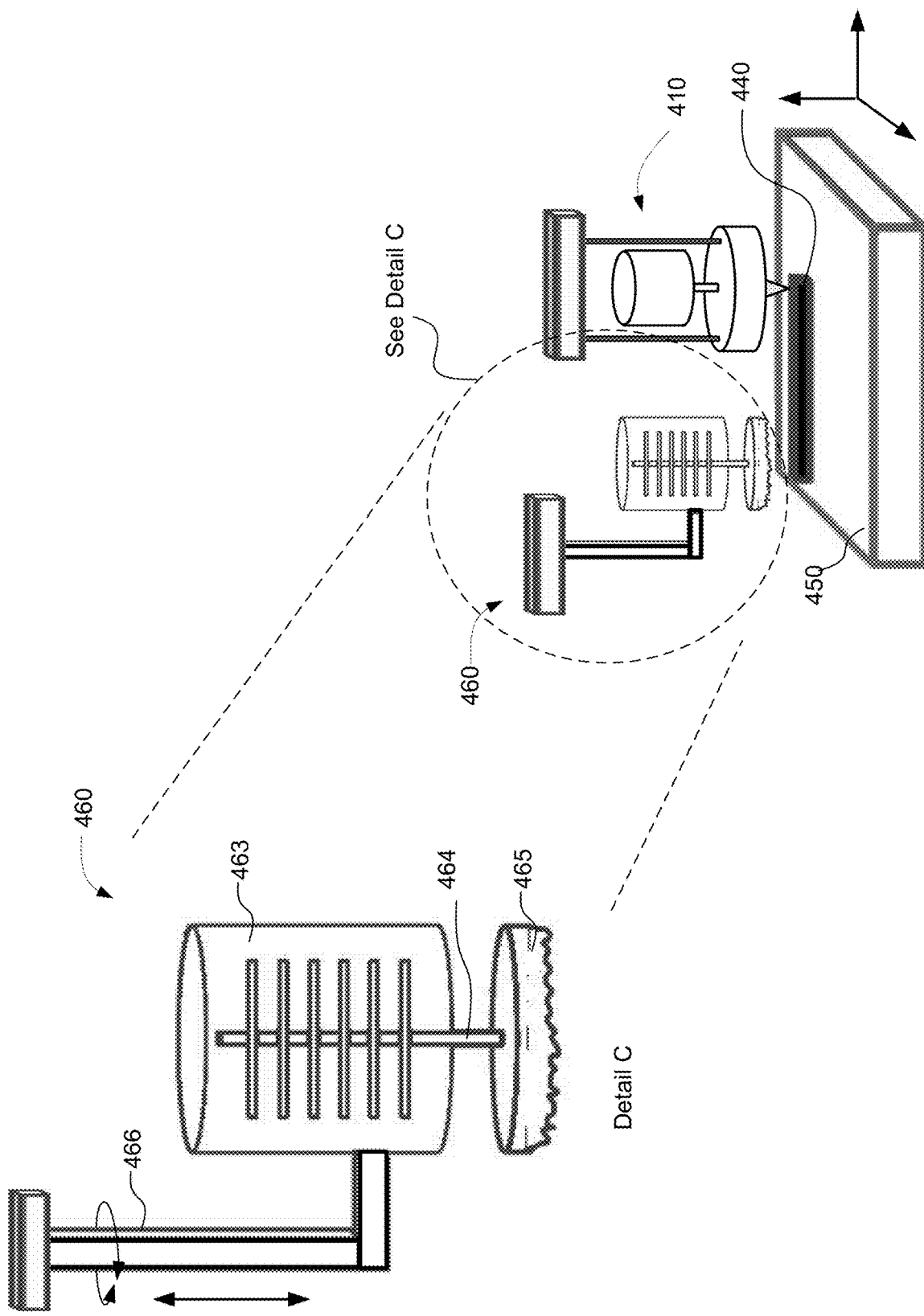
FIG. 4 illustrates an example of a thermal control arrangement configured to maintain temperature of the workpiece within a specified range, according to another implementation.

FIG. 4 illustrates an example of a thermal control arrangement configured to maintain temperature of the workpiece within a specified range. The workpiece (i.e., an additive machined product in process) may typically receive significant heat inputs during the process of manufacturing. For example, where the additive manufacturing process includes extrusion and deposition of a thermoplastic, a substantial portion of the thermal energy used in melting the thermoplastic filament is transferred to the workpiece. Particularly in the vacuum environment contemplated by the present disclosure, innovative techniques for cooling the workpiece may be necessary. In the implementation illustrated in FIG. 4, an A/M tool 410 is configured to build up a workpiece 440. In the illustrated implementation, the workpiece 440 is disposed on a platform or plate 450. Relative motion between the workpiece 440 and the A/M tool 410 may be obtained by translating one or both of the plate 450 and the A/M tool 410. A thermal control arrangement 460 may be disposed proximate to the A/M tool 410 and the workpiece 440. In the illustrated implementation, the thermal control arrangement 460 includes a container 463 of phase change material (PCM). The container 463 may be replaceable, as described above in connection with modules 230 of FIG. 2. In the illustrated implementation, a thermal path 464 couples the PCM within the container 463 with a heat spreader 465. The thermal path 464 may be or include one or more heat pipes, for example. The heat spreader 465 may be or include a rigid or flexible heat pipe and a thermal gasket or a malleable thermal conductive lower surface configured to conform to an upper surface of the workpiece 440. As a result, thermal conduction from the workpiece 440 the PCM within the container 463 may be facilitated. In the illustrated implementation, the container 463 may be mechanically coupled with an armature 466 that is configured to move the heat spreader 465 with respect to the workpiece 440. For example, the armature 466 may be configured to bring the heat spreader 465 into thermal contact with various portions of the workpiece 440 and/or may be configured to relocate the heat spreader 465 away from the workpiece 440.

As indicated above in connection with FIG. 1, the present disclosure contemplates an A/M subsystem compatible with a spacecraft on-orbit space environment characterized by near vacuum pressure and near zero-g force, the A/M subsystem including a contamination control arrangement. It should be appreciated that, in the absence of the presently disclosed techniques, outgassing byproducts from an A/M process, including particularly volatile organic compounds (VOCs), pose considerable risks of damage to spacecraft contamination sensitive control equipment including thermal control surfaces, solar array panels, and sensors. In addition, uncontrolled venting such byproducts may produce torques that adversely affect attitude control of the spacecraft.

Figure 5:
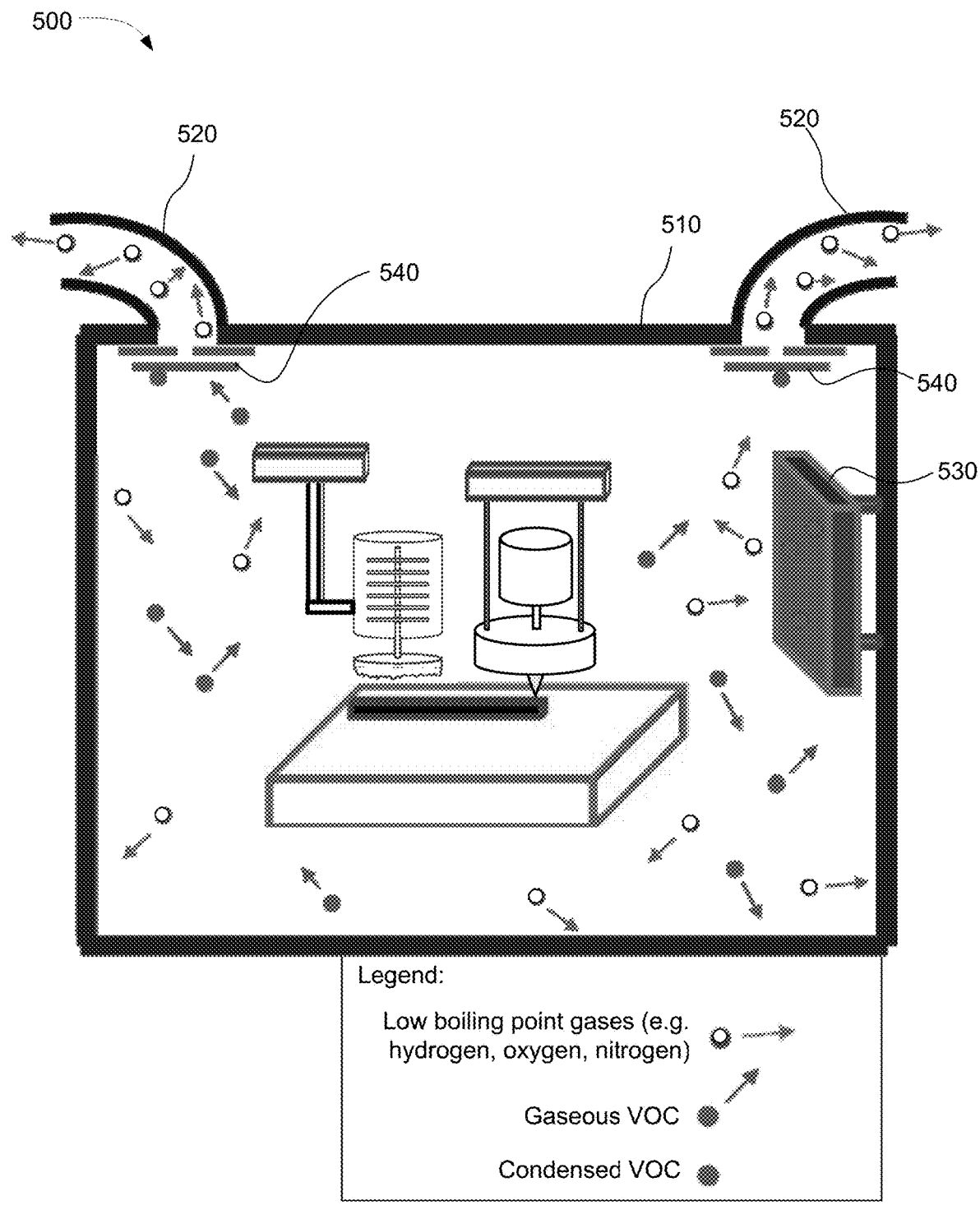
FIG. 5 illustrates a contamination control arrangement, according to an implementation.

As described in more detail hereinbelow, the contamination control arrangement of the present disclosure is configured to control outgassing of A/M byproducts in the on-orbit space environment. In some implementations, controlling outgassing of A/M byproducts includes one or both of preventing the VOCs from reaching contamination sensitive equipment on board the spacecraft and to preventing the A/M byproducts from producing a substantial net torque on the spacecraft. FIG. 5 illustrates a contamination control arrangement, according to an implementation. The contamination control arrangement 500 includes an enclosure 510 within which an A/M tool, workpiece and thermal control arrangement may be arranged, such as, in the illustrated example, A/M tool 410, workpiece 440 and thermal control arrangement 460 (FIG. 4). The contamination control arrangement 500 may include vent ducts 520, a scavenger plate 530 and cold traps 540. It is contemplated that the interior of contamination control arrangement 500 will be vented to space by way of vent ducts 520, and thus be at near vacuum pressure during on-orbit operations. During operation of the A/M tool 410, gaseous byproducts may be produced, including, as indicated in FIG. 5 a quantity of low boiling point gases, and a quantity of gaseous VOCs.

Stated briefly, the contamination control arrangement 500 is configured prevent the VOCs from escaping to space and to permit the low boiling point gases to escape in a manner that avoids imparting a substantial net torque to the spacecraft. With regard to low boiling point gases (primarily, for example, hydrogen, nitrogen and oxygen), such gases may be allowed to vent freely by way of the vent ducts 520. Advantageously two or more vent ducts may be arranged such that a net torque imparted by escaping gases is nearly zero. For example, in the illustrated implementation, each of two vent ducts is oriented to produce mutually opposing torques. The contamination control arrangement 500, advantageously, prevents the escape of VOCs which have the potential to damage condense on and adhere to contamination sensitive spacecraft equipment. In the illustrated implementation for example, at least one scavenger plate 530 is disposed within the enclosure 510. In some implementations, the scavenger plate may be maintained at a temperature no higher than the lowest condensation temperature of the VOCs. Similarly, cold traps 540 may be maintained at a temperature no higher than the lowest condensation temperature of the VOCs. Interior walls of the enclosure 510 and surfaces within the enclosure 510 other than the scavenger plate 530 and the cold traps 540 may be maintained at a temperature substantially higher than the highest condensation temperature of the VOCs. As a result, gaseous VOCs that are a byproduct of the operation of the A/M tool 410 will, over a period of time, preferentially condense on surfaces of the scavenger plate 530 and the cold traps 540 and not elsewhere within the enclosure 510.

In some implementations, the contamination control arrangement 500 may include heaters (not illustrated) configured to maintain a minimum temperature of selected surfaces well above the highest condensation temperature of the VOCs. Heaters may also, for example, be configured to outgas internal wall surfaces of the enclosure 510 and/or to outgas the workpiece 440 (FIG. 4). One or more of the heaters may be configured as is elements integrated into walls of the enclosure 510, in some implementations. The contamination control arrangement 500 may also include thermistors, thermocouples and/or other temperature monitoring devices (not illustrated) that are configured to monitor temperatures of wall surfaces of the enclosure 510, the scavenger plate 530 and the cold traps 540.

In some implementations, the scavenger plate 530 and/or the cold traps 540 may include a removable plate, a surface of which is configured to collect condensed VOCs. Because VOC contaminants may have a high value of infrared emittance, collection of condensed VOCs on the scavenger plate 530 and/or the cold traps 540 may lead to increased temperatures and decreased collection efficiency. In some implementations, to mitigate this problem, a physical barrier such as, for example, a multi layer thermal shield may be disposed so as to reduce line of sight between the scavenger plate 530 and/or the cold traps 540 and interior features of the contamination control arrangement 500. In addition, during the course of a spacecraft mission, one or more of the removable plates may be removed and replaced. Thus, a removable plate that has become less efficient as a result of collecting a quantity of condensed VOCs, may be removed and replaced with a new, clean, removable plate. In some implementations, removing and replacing the removable plates may be executed by a robotic manipulator (e.g., robotic manipulator 1400 of FIG. 1). In some implementations, the removable plates may be configured to have a thermally conductive interface with a "bottom" plate that includes temperature control features that need not be disturbed during replacement of a removable plate. For example, the bottom plate may be permanently coupled with heat pipes or other thermal paths.

In some implementations, to facilitate maintenance of scavenger plate and/or cold trap temperatures no higher than the lowest condensation temperature of the VOCs, the scavenger plate 530 and/or the cold traps 540 may include a highly polished surface finish to minimize thermal coupling with the interior features of the contamination control arrangement 500. In some implementations, the scavenger plate 530 and/or the cold traps 540 may be coupled by way of heat pipes (not illustrated) to spacecraft thermal radiator panels to facilitate heat removal from the scavenger plate 530 and/or the cold traps 540.

In some implementations, the robotic manipulator may be configured to place a contaminated plate in a sealable enclosure (e.g., a plastic bag), the sealable enclosure being configured to prevent escape of the VOCs, whether or not the temperature of the removable plate exceeds a boiling temperature of the VOCs.

Figure 6:
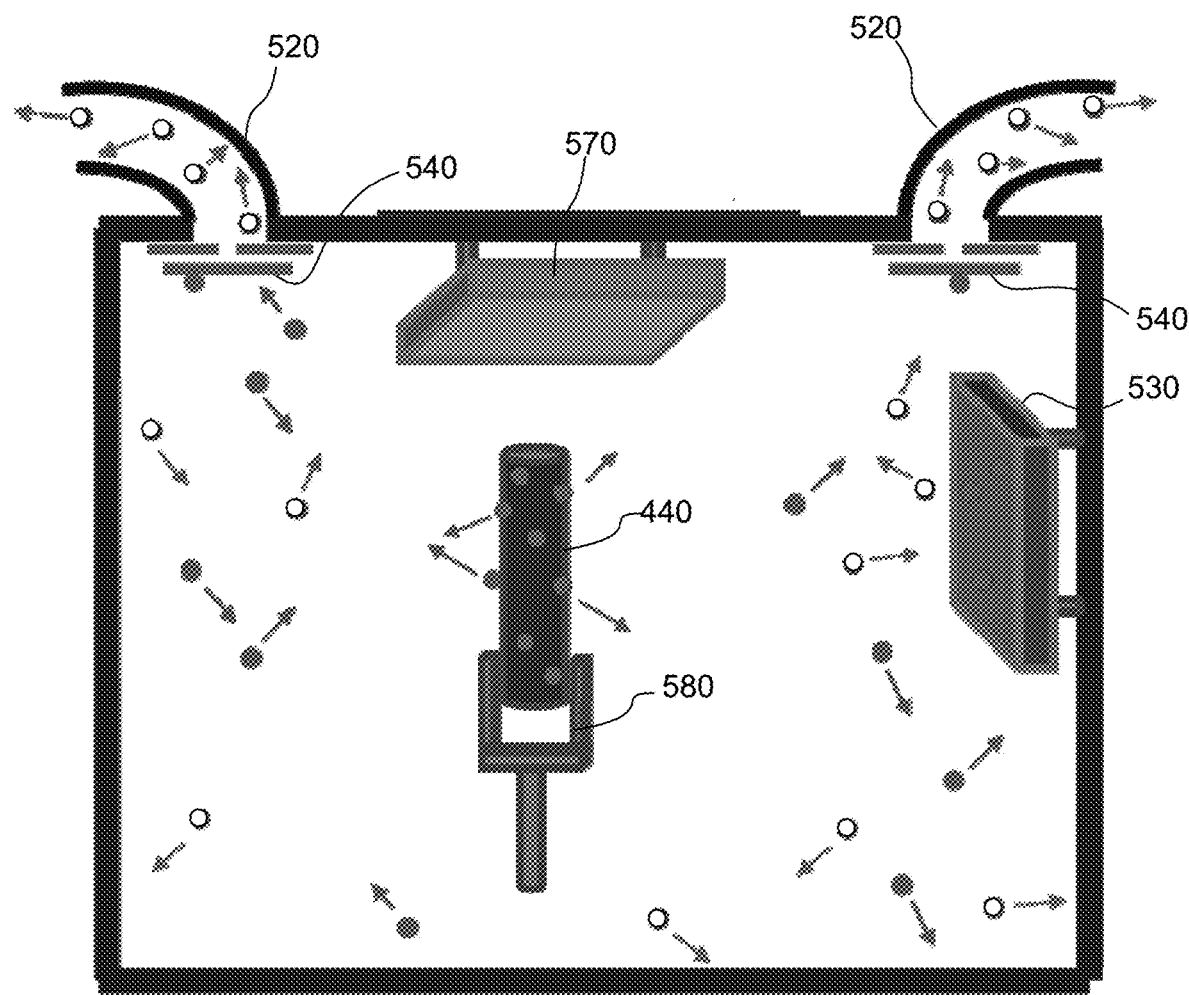
FIG. 6 illustrates features of the contamination control arrangement including a radiative heater and a robotic manipulator, according to an implementation.

In some implementations, the contamination control arrangement 500 may be configured to control outgassing of VOCs during post-processing operations of a workpiece. For example, it may be anticipated that some VOCs will deposit onto the workpiece during the A/M process, and require removal/cleaning before the workpiece may be taken outside the contamination control arrangement 500. FIG. 6 illustrates features of the contamination control arrangement 500 including a radiative heater 570 and a robotic manipulator 580. During a clean procedure, the workpiece 440 may be relocated by the robotic manipulator 580 to a position proximal to the radiative heater 570. As a result of heating the workpiece 440 with the radiative heater 570, condensed VOCs deposited on the workpiece 440 may evaporate off of the workpiece 440 and be captured by the scavenger plate 530 or the cold traps 540. Advantageously, the workpiece 440 may be heated to a temperature above the boiling temperature of the VOCs but below a glass transition temperature of the workpiece material.

Figure 7:
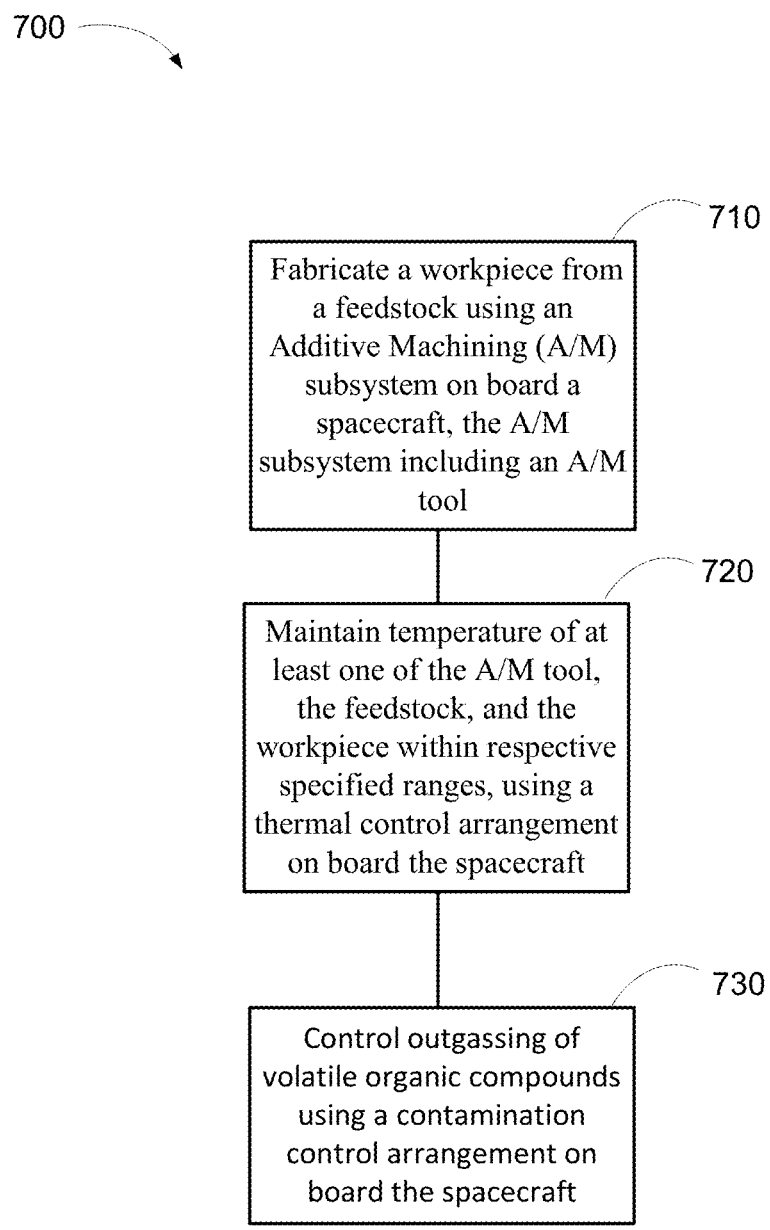
FIG. 7 illustrates a method for performing additive manufacturing (A/M) on board a spacecraft, according to an implementation.

Referring now to FIG. 7, a method for performing additive manufacturing (A/M) on board a spacecraft will be described. The method 700 includes a step 710 of fabricating a workpiece from a feedstock using an A/M subsystem on board the spacecraft in an on-orbit space environment characterized by near vacuum pressure and near zero-g force. As described hereinabove, the A/M subsystem may include an A/M tool and the feedstock and the spacecraft may include a thermal control arrangement and a contamination control arrangement.

At step 720, the thermal control arrangement maintains temperature of at least one of the A/M tool, the feedstock, and the workpiece within respective specified ranges. At step 730, the contamination control arrangement controls outgassing of volatile organic compounds (VOCs).

Thus, techniques for performing additive manufacturing on orbit have been disclosed. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A spacecraft comprising:
an additive manufacturing (A/M) subsystem configured to perform an A/M process in an on-orbit space environment characterized by near vacuum pressure and near zero-g force, the A/M process resulting in production of gaseous byproducts, the A/M subsystem including a contamination control arrangement; wherein
the A/M subsystem includes an A/M tool, feedstock and a workpiece and is configured to additively manufacture the workpiece using material from the feedstock; and
the contamination control arrangement is operable, in the on-orbit space environment, to control venting of the gaseous byproducts by preventing the gaseous byproducts from producing a substantial torque on the spacecraft.

2. The spacecraft of claim 1, wherein the A/M tool is an extruder including a melt zone, a cold zone and a transition portion disposed between the melt zone and the cold zone.

3. The spacecraft of claim 2, wherein the extruder is configured to limit heat transfer between the melt zone and the cold zone.

4. The spacecraft of claim 1, wherein the contamination control arrangement includes a chamber enclosing the A/M subsystem and one or more cold plates disposed in the chamber and configured to capture volatile organic compounds (VOCs) of the gaseous byproducts.

5. The spacecraft of claim 4, further comprising one or more radiative heaters configured to heat the workpiece to a temperature above a boiling temperature of the VOCs and below a glass transition temperature of the workpiece material.

6. The spacecraft of claim 4, further comprising a robotic manipulator configured to remove and replace the cold plates.

7. The spacecraft of claim 4, wherein the chamber includes vent paths disposed to allow exit of the gaseous byproducts while avoiding generation of a net torque on the spacecraft.

8. An additive manufacturing (A/M) subsystem for use on a spacecraft, the A/M subsystem comprising:
an A/M tool and a feedstock; wherein:
the A/M subsystem is configured to additively manufacture a workpiece using material from the feedstock by performing an A/M process in an on-orbit space environment characterized by near vacuum pressure and near zero-g force, the A/M process resulting in production of gaseous byproducts; and
the spacecraft includes a contamination control arrangement operable, in the on-orbit space environment, to control venting of the gaseous byproducts by preventing the gaseous byproducts from producing a substantial torque on the spacecraft.

9. The A/M subsystem of claim 8, wherein the A/M tool is an extruder including a melt zone, a cold zone and a transition portion disposed between the melt zone and the cold zone.

10. The A/M subsystem of claim 9, wherein the extruder is configured to limit heat transfer between the melt zone and the cold zone.

11. The A/M subsystem of claim 8, wherein the contamination control arrangement includes a chamber enclosing the A/M subsystem and one or more cold plates disposed in the chamber and configured to capture volatile organic compounds (VOCs) of the gaseous byproducts.

12. The A/M subsystem of claim 11, wherein the chamber includes vent paths disposed to allow exit of the gaseous byproducts while avoiding generation of a net torque on the spacecraft.

13. The A/M subsystem of claim 12, further comprising one or more radiative heaters configured to heat the workpiece to a temperature above a boiling temperature of the VOCs and below a glass transition temperature of the workpiece material.

14. The A/M subsystem of claim 12, further comprising a robotic manipulator configured to remove and replace the cold plates.

15. A method of performing an additive manufacturing (A/M) process on board a spacecraft, the method comprising:
fabricating a workpiece from a feedstock using an A/M subsystem on board the spacecraft in an on-orbit space environment characterized by near vacuum pressure and near zero-g force, the A/M process resulting in production of gaseous byproducts, the A/M subsystem including an A/M tool and the feedstock, the spacecraft including a contamination control arrangement; and
controlling, with the contamination control arrangement, venting of the gaseous byproducts, the control by preventing the gaseous byproducts from producing a substantial torque on the spacecraft.

16. The method of claim 15, wherein the contamination control arrangement includes a chamber enclosing the A/M subsystem and one or more cold plates disposed in the chamber and configured to capture volatile organic compounds of the gaseous byproducts.

17. The method of claim 16, wherein the spacecraft includes a robotic manipulator configured to remove and replace the cold plates.

18. The method of claim 16, wherein the chamber includes vent paths disposed to allow exit of the gaseous byproducts while avoiding generation of a net torque on the spacecraft.

* * * * *